United States Patent [19]

Honda et al.

[11] Patent Number: 4,749,595
[45] Date of Patent: Jun. 7, 1988

[54] PROCESS FOR PROCESSING GRANULES

[75] Inventors: Tetsuzo Honda; Kimikazu Kido, both of Funabashi, Japan

[73] Assignee: Toyo Engineering Corporation, Tokyo, Japan

[21] Appl. No.: 906,041

[22] Filed: Sep. 11, 1986

[30] Foreign Application Priority Data

Sep. 27, 1985 [JP] Japan .................. 60-215440

[51] Int. Cl.$^4$ ................. B05C 5/00; B05D 1/02
[52] U.S. Cl. .................. 427/213; 118/303; 118/DIG. 5; 264/117
[58] Field of Search ............ 118/DIG. 5, 303; 427/213; 425/222, DIG. 20; 264/117

[56] References Cited

U.S. PATENT DOCUMENTS

| 4,332,211 | 6/1982 | Nioh et al. | 118/303 X |
| 4,343,622 | 8/1982 | Bruynseels | 264/117 X |
| 4,353,709 | 10/1982 | Nioh et al. | 427/214 X |
| 4,353,730 | 10/1982 | Kinno et al. | 427/213 X |
| 4,354,450 | 10/1982 | Nagahama et al. | 427/213 X |
| 4,501,773 | 2/1985 | Nioh et al. | 427/213 |

Primary Examiner—John P. McIntosh
Attorney, Agent, or Firm—Flynn, Thiel, Boutell & Tanis

[57] ABSTRACT

Granules are processed with a liquid coating material in a vessel having a fluidizing bed on a horizontal or slightly inclined perforated plate and spouting beds, the fluidizing bed having a depth of 0.10 to 1.00 m in the static state and 0.30 to 1.50 m in the fluidizing state, the coating material being sprayed upwardly in a conical form with a spray angle of 30 to 80 degree from spray nozzles disposed in the spouting beds, a gas strean being fed at a spouting velocity of 5 to 50 m/sec. and a flow rate of 250 to 10,000 Nm$^3$/hour, each spouting bed unit being disposed in a density of 0.5 to 5 units/m$^2$ on the fluidizing bed.

5 Claims, 1 Drawing Sheet

PROCESS FOR PROCESSING GRANULES

FIELD OF THE INVENTION

This invention relates to a process for treating granules, more particularly, a process for preparing granules of desired size by enlarging or coating granules of smaller size. Specifically, this invention relates to a process for converting a variety of solid materials into granular products having the desired size for the intended use in the chemical industry, pharmaceutical industry, food industry or other industries.

DESCRIPTION OF THE PRIOR ART

A large number of processes have been proposed and practiced as techniques for preparing granules and techniques for coating granules.

Selection of one of these known processes may not give rise to significant differences in comparison to selection of another process, both technologically and economically, in cases where the intended products are produced in small quantities. In mass production processes, however, in addition to the problem of the selection of a suitable process, there still remain problems to be solved, since the adaptability of the apparatus to effect the selected process for the material to be processed is intimately associated with the efficiency of the processing.

It has been known that the processes using fluidizing bed, spouting bed and spout-fluid bed systems are suitable for mass production.

Because they are better in the stability of operation than other processes, an urgent, important, technical and economic problem in each of the three systems is to develop further improved processes capable of producing high grade products with high productivities.

Each of these processes involves a collective treatment of a large amount of granules. It is necessary to conduct trial and error experiments in order to improve their performance.

In these processes, it is important to maintain as frequent as possible opportunities for collision and adhesion between the fine liquid spray droplets of the coating material and the granules that are being processed, which granules are suspended or floating in a gas stream.

It is further important, for the size enlargement or coating of the granules being processed, to minimize the opportunities for collisions between the granules being processed while they are in a wetted state, even though this state may exist for only a very short period of time because the surfaces of the granules being processed are wetted in a moment due to the adhesion thereon of the fine liquid spray droplets. In addition, it is also important to control the duration of the time period during which the wetted state of the granules disappears owing to the solidification or drying of the liquid droplets that are adhered onto the surfaces of the granules being processed, which granules are being subjected to the size enlargement technique or the like.

The above three important requirements have to be observed and simultaneously the consumption of the smallest possible amount of energy for performing the process must be achieved.

Although different in concept from the process of the present invention, the process disclosed in U.S. Pat. No. 4,343,622 using a fluidizing bed system has been proposed.

In this process, an auxiliary gas is used to form voids for carrying out spraying in a fluidizing bed. The process is characterized by the features that the voids for carrying out the spraying are formed by the auxiliary gas which is fed into the fluidizing bed in such a manner that the voids do not reach or extend above the surface of the fluidizing bed. Thus, it is not a spout-fluid bed system, but rather, essentially is a fluidizing bed system because both the velocity of the granules being processed and the distance through which the granules rise in the fluidization vessel are limited.

In this process, nozzles which eject a coating material upwardly are distributed on the perforated plate (gas distributor plate or constriction plate) in the fluidization vessel for forming a fluidizing bed, and the fine droplets ejected from the nozzles are sprayed into the voids in the fluidizing bed at an included spray angle smaller than 20°. In order that a void will be formed and maintained in the fluidizing bed above each spray unit, an auxiliary gas having a high vertical velocity is flowed from an annular gas flowing opening which surrounds each nozzle in a concentric, annular and convergent manner. Due to the restrictions so imposed on the auxiliary gas, namely, that it does not form a spouting bed as described above and a small spray angle is employed, this process is accompanied by such drawbacks that the spray angle is small; the void through which the spray travels has a small diameter; the space for the collision and adhesion between the fine liquid droplets of the coating material sprayed in and the granules being processed is small; and the number of the voids for carrying out the spraying, i.e., the number of the nozzles, is large per unit area of the fluidizing bed.

SUMMARY OF THE INVENTION

The present inventors have made the invention described below as the result of the findings obtained by a long term study and development, starting with the processes of treating granules by forming a spouting bed in a static layer of granules as disclosed in Japanese Patent Publication No. 12895/1985 and a series of other patent publications, and have discovered a system of forming spouting beds in a fluidizing bed, i.e., a granule-processing process using a spout-fluid bed system.

Specifically, the present invention provides a process for processing granules by a spout-fluid bed system wherein:

(1) in order that opportunities are provided for all the granules being processed to collide with the sprayed-in liquid droplets of coating material as frequently and evenly as possible in the apparatus and that the cooling, heating, or drying of the granules being processed is facilitated by an increase of the freedom of transfer of heat and materials, a fluidizing bed is used in which the momentum of all of the granules being processed is maintained at a relatively high level in a space of a given volume, and, as the space suitable for this purpose, the height of the bed of solid granules is in the range of 0.10 to 1.00 m when the granules are in a static (nonfluidizing) state and is a larger value in the range of 0.30 to 1.50 m when the granules are in a fluidizing state;

(2) in order that the opportunities for the individual granules being processed to collide with each other is minimized, space is provided for the granules to float freely in a gas stream and in order that time is provided during which the wetted state of the granules disappears owing to solidification or drying of the fine sprayed liquid droplets that adhere onto the surfaces of the individual granules being processed, spouting beds that penetrate the fluidizing bed are arranged at spaced-apart locations therein and, moreover, directly above the fluidizing bed, a freeboard space is provided for permitting the granules being processed in the spouting bed to ascend and disengage from the gas and that freeboard space has a height in the range of 2 to 10 m;

(3) in order that the individual granules being processed are allowed to enter the spouting bed in as large a size as possible and to collide with the fine sprayed liquid droplets as intimately as possible, a coating material is sprayed in a large amount in a conical form, defining an upwardly expanding included spray angle in the range of 30° to 80°, from a spray nozzle for the coating material, which nozzle is disposed in the spouting bed and has an internal diameter in the range of 2 to 10 mm;

(4) in order that the power consumed for the formation of the spouting beds is minimized, while the individual granules being processed are allowed to float in a gas stream having a necessary and sufficient flow velocity and flow rate in the spouting bed, an annular spouting gas stream for forming the spouting bed is supplied at a flow velocity of 5 to 50 m/sec. and a flow rate of 250 to 10,000 $Nm^3$/hour from a gas stream spouting opening surrounding each spray nozzle for the coating material, which gas stream spouting opening is annular in cross section; and (5) in order that the efficiency of transfer of heat and materials with regard to the entire granule processing apparatus is maintained within a certain range and the cost of installation of the apparatus is reduced, a multitude of spouting bed units each comprising a spray nozzle for the coating material and a gas stream spouting opening of annular cross section, are provided and the number of said units is from 0.5 to 5 units/$m^2$, based on the horizontal area of the fluidizing bed.

BRIEF DESCRIPTION OF THE DRAWINGS

Referring to FIG. 1, there is shown a fluidization vessel having a vertical cylindrical sidewall 1, the upper end of which is closed by a ceiling 3 provided with a gas outlet 2 and the lower end of which is closed by a bottom wall 4.

Figure 1:
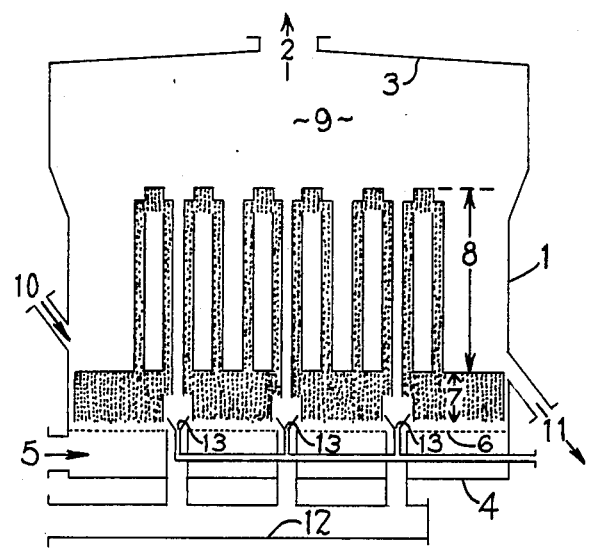
FIG. 1 is a schematic vertical cross section of an apparatus in which the present invention is practiced.

Although the horizontal cross section of the vessel 1 can be any desired, optional shape, the horizontal cross section of the upper part of the vessel may be of an enlarged cross-sectional area relative to the horizontal cross-sectional area of the lower part thereof in order to accelerate the disengagement or separation of the solids that are entrained in the ascending gas stream owing to reduction of the flow velocity of the ascending gas stream in the interior of the vessel.

A gas inlet 5 for the fluidization gas that forms the fluidizing bed is provided at the lower part of the sidewall 1 and communicates with a wind box or plenum located above the bottom plate 4, which plenum provides for the even distribution of the gas for forming the fluidizing bed. A perforated, gas distribution plate 6, also sometimes called a constriction plate, defines the bottom of the fluidizing bed by preventing back flow of the solids. The plate 6 is provided at the top of the plenum and above the bottom plate 4. The plate 6 can be horizontal or slightly inclined with respect to the horizontal.

The space between the ceiling 3 and the perforated plate 6 provides, from bottom to top, a zone 7 occupied by the fluidizing bed, a zone 8 called a disengaging space in which the granules that ascend with the gas from the fluidizing bed are separated from the gas by rising, then stalling and finally falling downwardly in the zone 8 while the gas continues to rise, and a zone 9 for collecting the ascending gas stream.

The zone 7 for forming the fluidizing bed is in the range of from 0.3 to 1.5 m in height. The zone 8 for separating the granules rising from the fluidizing bed is in the range of 2 to 10 m in height. The zone 9 for collecting the gas stream is in the range of 0.50 to 3.00 m in height.

A desired number of inlets 10 for the granules to be processed is provided in the sidewall 1 in the vicinity of the upper end of the zone 7 for forming the fluidizing bed. Outlets 11 for discharging the processed granules are provided in similar manner in as remote a position as possible away from the inlets 10.

Feed pipes 12 for feeding the gas for forming the spouting beds extend vertically through the plenum that is provided for effecting the even distribution of the fluidizing gas for forming the fluidizing bed. The pipes 12 open into the fluidizing-bed space 7 by penetrating through the perforated plate 6. The number of feed pipes 12 is in the range of from 0.5 to 5 feed pipes/$m^2$, based on the horizontal area of the fluidizing bed and the feed pipes are uniformly distributed on the perforated plate 6.

In the center of the central opening of each gas feed pipe 12, there is provided a spray nozzle 13 for effecting vertical upward spraying of droplets of a liquid coating material, wherein the spray pattern is in the form of an inverted cone and the spray angle of each nozzle is in the range of 30° to 80°.

Figure 2:
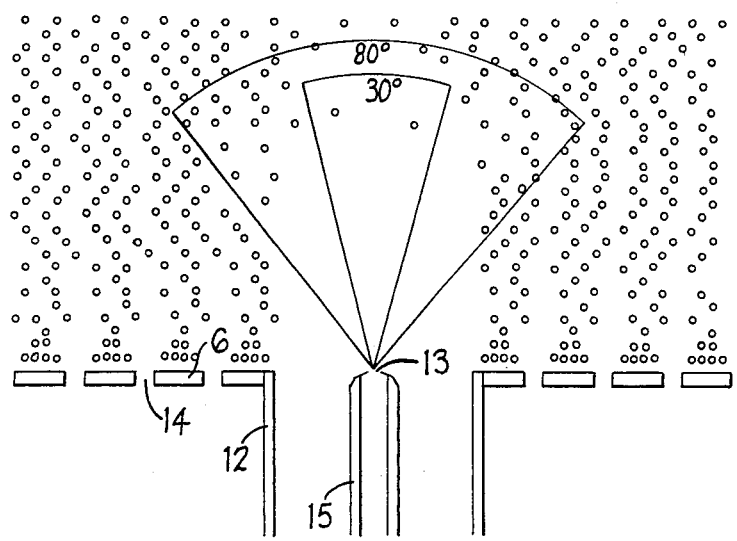
FIG. 2 is an enlarged vertical cross section illustrating a single spouting bed unit comprising the spray nozzle and the gas stream spouting opening and the neighboring zone of the fluidizing bed.

Illustrated in FIG. 2 is the detailed structure around the opening of a single gas feed pipe 12 and a spray nozzle 13, including the surrounding portion of the constriction plate 6 and showing the operation conditions. The black dots indicate granules so that the approximate pattern of distribution of the granules in the fluidizing bed and the spouting bed can be seen.

The constriction plate 6 of the fluidizing bed in FIG. 2 is a perforated plate providing gas flow passages 14 having a diameter of 2 to 6 mm. The passages 14 are spaced from each other a centerline-to-centerline distance of about 5 to 15 mm. The sum of the areas of all the passages 14 is from 5 to 20% of the total area of the constriction plate 6.

The gas feed pipes 12 are spaced equal distances from each other. The gas feed pipes 12, for supplying the gas for forming the spouting bed, are arranged vertically and extend through the plenum provided for distributing the gas for forming the fluidizing bed, which plenum is located under the perforated plate 6. The number of units, each comprising a nozzle 13 and a gas feed pipe 12, is from 0.5 to 5 units per $m^2$ of the horizontal area of the perforated plate 6. Only one of the gas feed units 14 is illustrated in FIG. 2.

The upper end of the gas feed pipe 12 penetrates the perforated plate 6 and opens into the space 7 in which the fluidizing bed is formed.

The internal diameter of the gas feed pipe 12 is in the range of 100 to 400 mm, preferably 150 to 250 mm.

The height of the vertical section of the gas feed pipe 12 is required to be at least one meter in a direction extending downwardly from the opening in the perforated plate 6.

The pressure of the spouting gas stream that flows upwardly through the pipe 12, at the opening (upper end) of the gas feed pipe 12, is in the range of 0.03 to 0.2 $kg/cm^2G$, depending on the thickness of the fluidizing bed in the space 7 and the density of the granules being processed. The flow velocity of the spouting gas stream flowing into the space 7 from the pipe 12 is not higher than 50 m/sec. and preferably is in the range of 10-20 m/sec.

On the other hand, the pressure of the fluidizing gas for forming the fluidizing bed, that is, the pressure in the plenum space provided for the gas distribution, is selected similarly to be in the range of 0.03 to 0.2 $kg/cm^2G$ depending on the thickness of the fluidizing bed and the density of the granules being processed. Thus, the spouting gas and the fluidizing gas have similar pressures but the flow velocity of the spouting gas is much higher than the flow velocity of the fluidizing gas.

In the center of the opening of each gas feed pipe 12 there is disposed a spray nozzle 13 for supplying fine droplets of the liquid coating material. The spray nozzle 13 has an internal diameter in the range of 2 to 10 mm and it opens toward the space 7 at a location which is in a vertical zone that extends from 100 mm below to 100 mm above the upper surface of the perforated plate 6.

The spray nozzle 13 has an outer diameter in the range of 10 to 50 mm and it is provided, if required, with a jacket in which a heating medium, such as steam, is flowed as a means of heating for the purpose of securing the fluidity of the coating material.

During the operation of the apparatus, fine droplets of the liquid coating material are sprayed in the form of an inverted cone, at a pressure of 3 to 20 $kg/cm^2G$, from the spray nozzle 13, with the spray angle being in the range of 30° to 80° as illustrated in FIG. 2.

As shown in FIG. 2, one of the features of the present invention is that the diameter of the bottom of the spouting bed unit, that is, the internal diameter of the pipe 12, is in the range of 100 to 400 mm, while the pressure of the spouting gas stream for forming the spouting bed, which is supplied through the gas feed pipe 12, is in the range of as low as 0.03 to 0.2 $kg/cm^2G$. As a result of experiments, unit structures within these ranges of dimensions and operating under these pressure conditions make it possible to form a space which is most suitable as a location into which the fine droplets of liquid coating material can be sprayed. In this space the granules being processed are present sparsely or in low numbers relative to the numbers of them in the fluidized bed as a whole, so that there is formed, in each spouting bed unit, a stable spouting bed within and extending through and beyond the upper surface of the fluidizing bed. In the spouting beds, the granules being processed undergo complete adhesion and solidification of the fine droplets of the liquid coating material and they rise into the disengaging space 8 above the fluidizing bed 7 because they are entrained by the spouting gas stream having a flow velocity of 5 to 50 m/sec.

The flow velocity of the spouting gas stream which has formed the spouting bed is reduced rapidly in the disengaging space 8 because of the expansion of the volume of the flow path, after the gas stream has passed through the fluidizing bed.

The granules being processed rise in the disengaging space 8 above the fluidizing bed 7 and they stall at a height of 1 to 10 m above the upper surface of the fluidizing bed and then fall down onto the upper surface of the fluidizing bed, during which time they are dried and cooled.

The granules that have flowed downwardly into the fluidizing bed eventually reach the spouting beds again and are subjected to another adhesion of the fine droplets.

The processing of the granules is effected by repetitions of the operation as described above.

Figure 3:
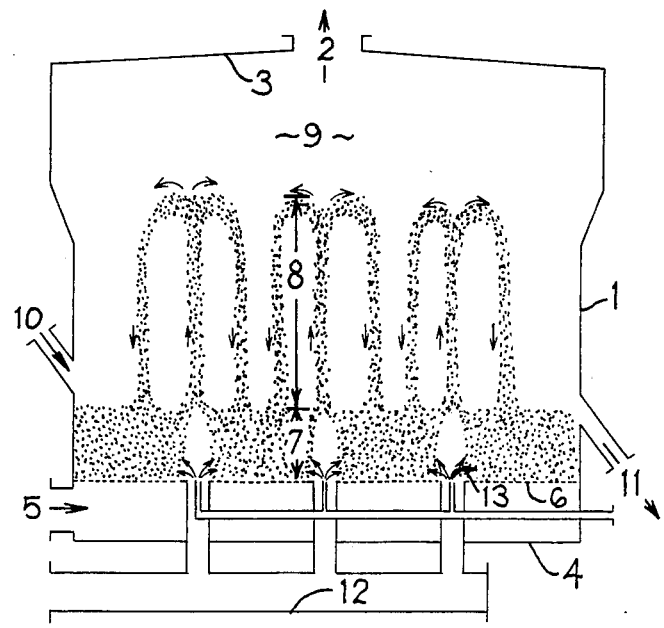
FIG. 3 indicates a fluidization of granules when the process of the invention is effectively worked.

It is noted above that the fluidization vessel 1 has three zones 7, 8 and 9 in view of the fluidization of granules when the process of the invention is worked. The actual movement of the granules is shown in FIG. 3 and illustrated below. The zone 7 is a fluidizing bed in which granules move at randam and the dense phase of the granules is formed. The movement of the granules is milder in the zone 7 than in the zone 8. The zone 8 is a disengaging space in which granules are lifted by the driving force of the spouting gas and then come down, losing the velocity. The actual movement of the granules is shown by arrows in FIG. 3 and looks like a spring. In the upper portion of the zone 8, the granules move slowly and in the lower they move quickly. In the zone 8, the lean phase of the granules is formed. The zone 9 is a gas zone in which the spouting gas comes together, no granule is substantially seen, but dust produced by abrasion between granules may be lifted.

Another feature of the process of the present invention is that the rising, stalling and falling of the granules is caused by the spouting beds which penetrate the fluidizing bed and are formed to project upwardly into the disengaging space above the fluidizing bed.

The reason for the importance of this granule-moving behavior is that, during the time period in which the granules being processed, which have been wetted by being subjected to the adhesion of the fine droplets at the lower part of the spouting bed, rise, stall and fall in the spouting bed that extends above the fluidizing bed and finally reach the surface of the fluidizing bed, the fine liquid droplets adhered onto the surfaces of the granules being processed are dried and lose their adhesive property completely.

As contrasted with the process of the present invention in which each spouting bed has a bottom or base of a large diameter and extends upwardly to a high level, in the case of the process disclosed U.S. Pat. No. 4,343,622 in which no spouting bed is formed and the base section of the void for effecting spraying has a small diameter, the granules being processed are not spouted into the space above the fluidizing bed. Therefore, in U.S. Pat. No. 4,343,622 the granules being processed do not rise, stall and fall in the disengaging space above the fluidizing bed, but rather, they move only in the space inside the fluidizing bed and below the upper surface of the fluidizing bed, even though the pressure of the releasing gas stream for forming the voids for effecting the spraying is higher than the pressure used in the process of the present invention. Accordingly, there is a strong possibility that the dryness and the disappearance of the adhesive property of the fine droplets adhered onto the surfaces of the granules being processed will be insufficient so that the granules being processed will tend to agglomerate due to their wetted surfaces and large mutual adhesive property. Thus, it is impossible to supply a large amount of the sprayed droplets into the voids for effecting the spraying and therefore it is difficult to increase the production capacity per unit horizontal area of the processing section of the apparatus.

Another feature of the process of the present invention is that the coating material is sprayed in the form of fine liquid droplets from the supply nozzle 13 with an included spray angle of 30° to 80°, using a pressure in the range of 3 to 20 kg/cm$^2$G, whereby the coating material is supplied in as large an amount as possible to the lower part of the large-diameter spouting bed that extends upwardly from the upper end of the pipe 12, through the fluidizing bed 7 to the disengaging space 8 above the fluidizing bed, thereby increasing the production capacity of the apparatus.

A further feature of the process of the present invention is that the supply pressure of the spouting gas stream for forming the spouting beds is low. For example, in the granulation of urea, it is sufficient to use air at a pressure of not higher than 0.1 kg/cm$^2$G. As compared with the case wherein air having a pressure of 0.4 kg/cm$^2$G is used as an auxiliary gas, as described in Japanese Patent Publication No. 13735/1985, the power saving due to the difference in the air pressures corresponds to about 10 KWH per ton of the product.

A still further feature of the present invention is that since the spray nozzle 13 is provided in the center of the gas feed pipe 12 of large diameter, a jacket 15 through which passes a heating medium to ensure the fluidity of the coating material can be installed with ease around the nozzle 13 itself and the pipe for supplying the coating material to the nozzle 13, if required.

When the heating jacket 15 is not installed, the spouting gas that flows through the gas feed pipe 12 which houses the supply pipe and the nozzle 13 for the liquid coating material must be kept at a high temperature and, when the interior of the apparatus has to be cooled in view of the heat balance within the apparatus, the fluidizing gas for forming the fluidizing bed must be increased in an amount equivalent to or more than that of the spouting gas that flows through the gas feed pipes 12 so that the heat input caused by the use of high temperature gas in the spouting gas feed pipes 12 invites a steep rise in the equipment and power cost and thus is significantly disadvantageous.

EXAMPLE

Urea granules having an average granular size of 3 mm were produced at a production rate of 1,000 ton/day from a urea melt with a concentration of 95%. The shape of the horizontal cross section of the granulation section, into which urea granules having an average size of 2 mm are supplied, was rectangular with one pair of sides having a dimension of 2 m and the other pair of sides having a dimension of 5 m. The granules were supplied to a fluidizing bed inside the granulation section from two inlets which were provided in the 2 m sides of the rectangle, at a feed rate of 21,000 kg/hour.

A fluidizing bed with a depth of about 1 m was formed inside the granulation section by means of air for fluidization supplied under the conditions of a pressure of 0.08 kg/cm$^2$G, a volumetric flow rate of 61,000 Nm$^3$/hour and a temperature of 30° C.

Spaced evenly on the perforated plate 6 at the bottom of the fluidizing bed were ten spouting openings, each being 200 mm in diameter, for supplying the spouting gas stream for forming the spouting beds. From each of the openings, air for forming the spouting beds was spouted under the conditions of a pressure of 0.08 kg/cm$^2$G, a volumetric flow rate of 20,000 Nm$^3$/hour and a temperature of 30° C.

In the center of each spouting opening for the spouting gas stream for forming the spouting bed, there was provided a spray nozzle having an inner diameter of 6 mm, from which a urea melt was sprayed under the conditions of a pressure of 10 kg/cm$^2$G, a flow rate of 4,400 kg/hour and a temperature of 125° C.

The granules processed in the spouting beds rose up to an average height of 5 m above the surface of the fluidizing bed and thereafter fell down onto the fluidizing bed.

From an outlet opening on the opposite side of the fluidization vessel relative to the side in which the inlets of the granules to be processed were provided, a granular urea containing the product of urea granules having an average granular diameter of 3 mm in a proportion of 85% was discharged at a flow rate of 62,700 kg/hour.

The embodiments of the invention in which an exclusive propery of privilege is claimed are defined as follows:

1. In a process for coating granules wherein granules being processed form a fluidizing bed on a horizontal or slightly inclined perforated plate and a liquid coating material for the granules is supplied in the form of fine droplets to spouting beds distributed in the fluidizing bed so that that granules are coated by the coating material, the improvement which comprises:
    maintaining the depth of the fluidizing bed in the range of 0.10 to 1.00 m in a static state and 0.30 to 1.50 m in the fluidized state;
    maintaining the disengaging space for the granules being processed in the range of 2 to 10 m above the fluidizing bed;
    spraying the coating material upwardly in conical form with a spray angle in the range of 30° to 80° from spray nozzles for the coating material disposed in the spouting beds; and
    forming a gas stream for each spouting bed from a gas stream spouting hole which surrounds each spray nozzle for the coating material and is annular in horizontal cross section, said gas stream being fed at a spouting velocity in the range of 5 to 50 m/sec. and a flow rate in the range of 250–10,000 Nm$^3$/hour;
    wherein each spouting bed unit, comprising a spray nozzle for the coating material and a gas stream spouting hole, is disposed in a density ranging from 0.5 to 5 units/m$^2$ on the basis of the horizontal area of the fluidized bed.

2. The process for coating granules of claim 1, wherein the pressure of the gas stream for the spouting beds is 0.03 to 0.2 kg/cm$^2$G, the flow velocity of the gas stream for the spouting beds is 10 to 20 m/sec and the pressure of fluidizing gas used in forming the fluidizing bed is 0.03 to 0.2 kg/cm$^2$G.

3. The process for coating granules of claim 1, wherein the liquid coating material is urea and the gas stream for the spouting beds is air at a pressure of not greater than 0.1 kg/cm$^2$G.

4. The process for coating granules of claim 1, wherein the perforated plate has gas flow passages that have a total combined area of from 5 to 20% of the total area of the perforated plate.

5. A process for effecting size enlargement of granules which comprises:

feeding the granules into a vertical fluidization vessel comprised of a fluidized-bed portion having a height of from 0.3 to 1.5 meters, a disengaging space above said fluidized-bed portion and having a height of from 2 to 10 meters, a gas collection space above said disengaging space, a plenum chamber below said fluidized-bed portion and a perforated plate between said plenum chamber and said fluidized-bed portion, so as to form a bed of granules in said fluidized-bed portion, said fluidization vessel having a plurality of spouting bed units penetrating through said perforated plate and uniformly distributed thereon wherein there are provided from 0.5 to 5 spouting bed units per square meter of the horizontal area of said fluidized bed portion, each spouting bed unit comprising spouting gas feed pipe having an internal diameter in the range of 100 to 400 mm and a spray nozzle centrally located in said spouting gas feed pipe and located substantially at the level of said perforated plate;

feeding fluidizing gas into said plenum chamber and thence through said perforated plate into said fluidized-bed portion at a pressure of from 0.03 to 0.2 kg/cm$^2$ gage to form a fluidized-bed of said granules suspended in said fluidizing gas and in which the number of granules per unit volume is relatively high;

simultaneously feeding spouting gas through said spouting gas feed pipes of said spouting bed units into said fluidized-bed portion at a pressure of from 0.03 to 0.2 kg/cm$^2$ gage, a flow velocity of from 5 to 50 meters/sec. and a volumetric flow rate of from 250 to 10,000 Nm$^3$/hr so as to form spouts consisting of granules suspended in said spouting gas, said spouts extending upwardly through and thence projecting above the upper surface of said fluidized bed into said disengaging space, the number of granules per unit volume of said spouting gas in said spouts being relatively low;

and simultaneously spraying finely divided liquid droplets of coating material at a pressure of from 3 to 20 kg/cm$^2$ gage in an inverted conical form having an included spray angle of from 30° to 80°, vertically upwardly into said fluidized-bed portion whereby said coating material flows through said spouts and is deposited on the granules it contacts;

the coated granules in said spouts rising into said disengaging space and then separating by gravity from the spouting gas and falling downwardly onto the upper side of the fluidized bed.

* * * * *